United States Patent
Catalano et al.

(10) Patent No.: US 11,178,856 B2
(45) Date of Patent: Nov. 23, 2021

(54) COGNITIVE HIVE ARCHITECTURE

(71) Applicant: International Business Machines Corporation, Armonk, NY (US)

(72) Inventors: Pasquale A. Catalano, Wallkill, NY (US); Andrew G. Crimmins, Montrose, NY (US); Robert K. Overton, Olivebridge, NY (US); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 337 days.

(21) Appl. No.: 16/175,160

(22) Filed: Oct. 30, 2018

(65) Prior Publication Data
US 2020/0128796 A1  Apr. 30, 2020

(51) Int. Cl.
*A01K 47/06* (2006.01)
*G06F 16/23* (2019.01)

(52) U.S. Cl.
CPC .......... *A01K 47/06* (2013.01); *G06F 16/2379* (2019.01)

(58) Field of Classification Search
CPC ...... A01K 47/00; A01K 47/06; A01K 29/005; G06F 16/2379; G06F 16/23
USPC .......................................... 449/1–3; 700/275
See application file for complete search history.

(56) References Cited

U.S. PATENT DOCUMENTS

| | | | |
|---|---|---|---|
| 2,340,219 A * | 1/1944 | Hawkins | A01K 47/00 449/35 |
| 6,910,941 B2 | 6/2005 | Bromenshenk et al. | |
| 7,905,762 B2 | 3/2011 | Berry | |
| 8,152,590 B2 | 4/2012 | Brundage | |
| 8,771,035 B2 | 7/2014 | Engel | |
| 9,474,776 B2 | 10/2016 | Stamets | |
| 10,064,395 B2 * | 9/2018 | Chapa | G01G 19/52 |
| 2010/0198023 A1 * | 8/2010 | Yanai | A01K 29/005 600/301 |
| 2011/0279650 A1 * | 11/2011 | Liao | G06K 9/00201 348/46 |

(Continued)

OTHER PUBLICATIONS

"British Columbia Honey Producers' Association"; Bee Scene; vol. 27, No. 3; 2011; 48 Pages.

(Continued)

*Primary Examiner* — Lisa L Tsang
(74) *Attorney, Agent, or Firm* — Cantor Colburn LLP; Steven Chiu

(57) ABSTRACT

A cognitive hive architecture for determining and managing a hive health index of a hive. The cognitive hive architecture is executable by a processor in communication with a computing device or a computing environment. The cognitive hive architecture includes sensors embedded within the hive. The cognitive hive architecture acquires data from the sensors, which are monitoring real-time conditions of the hive. The data being representative of the real-time conditions. The cognitive hive architecture tags the data to physical identifications and positional identifications to produce tagged data. The cognitive hive architecture associates the tagged data to physical profiles and positional profiles and generates the hive health index based on the physical profiles and the positional profiles.

19 Claims, 7 Drawing Sheets

(56) References Cited

U.S. PATENT DOCUMENTS

| | | | | |
|---|---|---|---|---|
| 2013/0271286 | A1* | 10/2013 | Quan | G08C 17/00 |
| | | | | 340/691.6 |
| 2015/0084784 | A1* | 3/2015 | Suta | A01K 47/06 |
| | | | | 340/870.01 |
| 2015/0123801 | A1* | 5/2015 | de Leon | A01K 47/06 |
| | | | | 340/573.3 |
| 2015/0192914 | A1* | 7/2015 | Slupik | G05B 15/02 |
| | | | | 700/275 |
| 2015/0366169 | A1* | 12/2015 | Jiang | A01K 29/005 |
| | | | | 449/20 |
| 2016/0212976 | A1* | 7/2016 | Bulanyy | A01K 47/06 |
| 2016/0353715 | A1 | 12/2016 | Temby et al. | |
| 2017/0071169 | A1* | 3/2017 | Benedetti | G01V 3/088 |
| 2017/0360010 | A1* | 12/2017 | Wilson-Rich | A01K 47/06 |
| 2018/0118340 | A1* | 5/2018 | Russo | A01K 59/00 |
| 2018/0180424 | A1* | 6/2018 | Cuddihy | G01C 21/3415 |
| 2019/0053470 | A1* | 2/2019 | Singh | A01K 11/006 |
| 2020/0267945 | A1* | 8/2020 | Symes | A01K 47/06 |
| 2020/0315143 | A1* | 10/2020 | Radzyner | A01K 47/06 |

OTHER PUBLICATIONS

"Intergrating Gender and Nutrition within Agricultural Extension Services"; Technology Profile: Langstroth Beehive; Feed the Future; May 2016; 5 Pages.

Markham; "High Tech Monitor Helps Beekeepers Track Bee Activity and Colony Health in Realtime"; Retrieved: http://www.treehugger.com/gadgets/high-tech-monitoring-system-helps-beekeepers-track-bee-activity-and-colony-health-realtime.html; Sep. 28, 2015; 3 Pages.

* cited by examiner

COGNITIVE HIVE ARCHITECTURE

BACKGROUND

The disclosure relates generally to cognitive hive architecture.

In general, bees live in colonies, which can include several thousand worker bees, a queen bee, and, sometimes, hundreds or thousands of drones. A hive can be a natural or artificial structure to house a colony or portion thereof. Further, bees are a critical foundation stone of agriculture production, as bees are used by farmers to pollinate plants.

For example, in Florida, bees pollinate plants year round with a particular focus through winter. In late-winter and/or early-spring, the bees can be shipped to California to pollinate almonds and other nut crops (e.g., pistachios). Soon thereafter (e.g., mid- to late-spring), the same bees can be shipped to Washington and New York to pollinate apples and other stone fruit, to Maine to pollinate blueberries, and to Pennsylvania to pollinate squash and pumpkins. Any time subsequent thereto (e.g., late-summer and on), the bees are shipped back to Florida to return to pollinating plants through the winter.

Yet, bee populations across the world are declining partly due to colony collapse disorder. Colony collapse disorder is a sudden and mass disappearance of worker bees in a bee colony. In this regard, the above Florida-California-Washington-New York-Maine-Pennsylvania-Florida travel cycle example can be stressful for the bees and may be a contributor to the colony collapse disorder (e.g., commercial migration follows the crop calendar and does not take into consideration the health of the bees). Because bee health is multi-faceted concern that is not well understood, a cognitive approach to assist beekeepers, to better understand colony collapse disorder, and to prevent/counteract colony collapse disorder is needed.

SUMMARY

According to one or more embodiments, a cognitive hive architecture for determining and managing a hive health index of a hive is provided. The cognitive hive architecture is executable by a processor in communication with a computing device or a computing environment. The cognitive hive architecture includes sensors embedded within the hive. The cognitive hive architecture acquires data from the sensors, which are monitoring real-time conditions of the hive. The data being representative of the real-time conditions. The cognitive hive architecture tags the data to physical identifications and positional identifications to produce tagged data. The cognitive hive architecture associates the tagged data to physical profiles and positional profiles and generates the hive health index based on the physical profiles and the positional profiles.

According to one or more embodiments, the above cognitive hive architecture can be implemented as a computer-implemented method, a system, and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Figure 1:
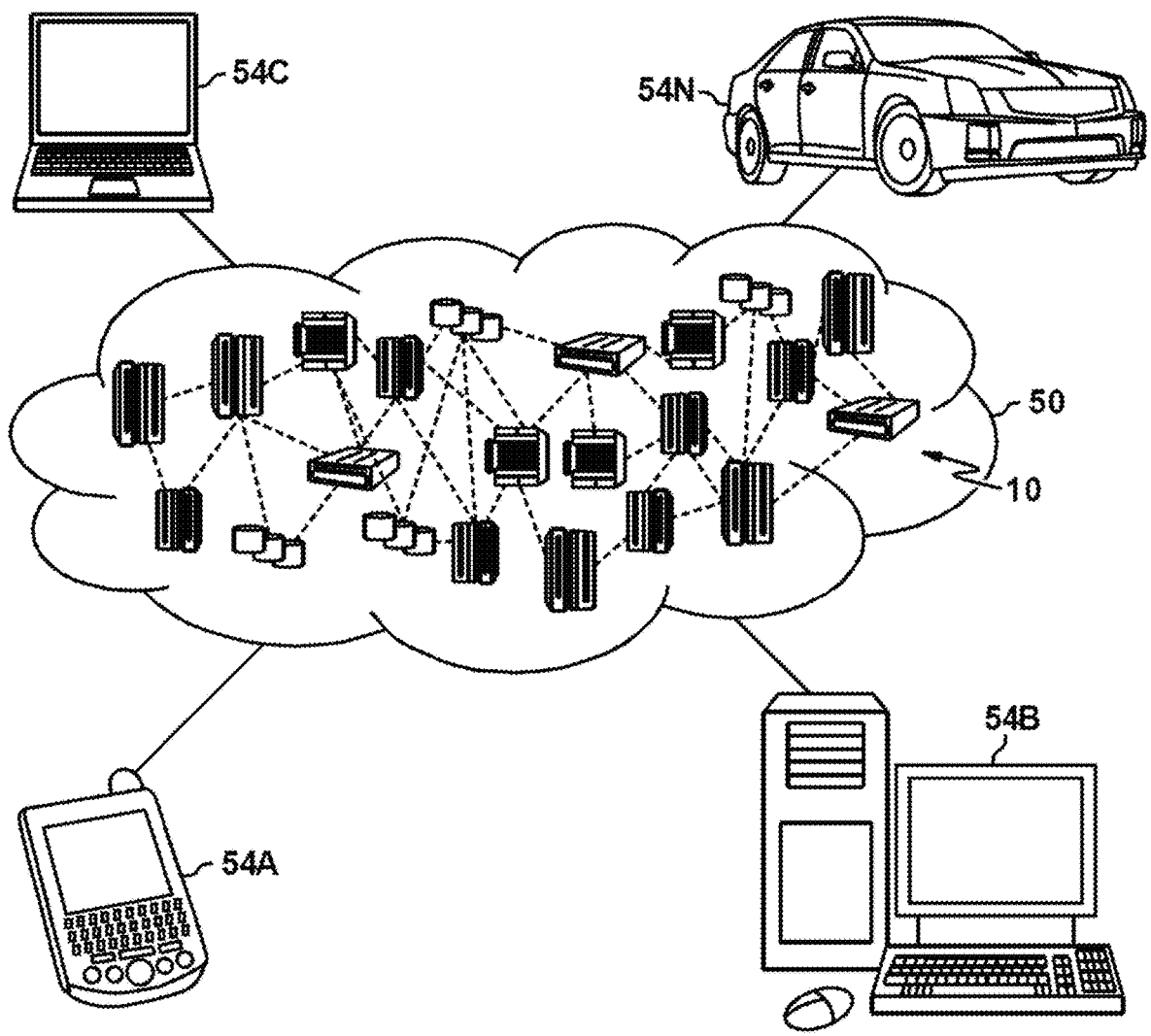
FIG. 1 depicts a cloud computing environment in accordance with one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as discussed above, a solution is needed that evaluates the Florida-California-Washington-New York-Maine-Pennsylvania-Florida travel cycle and any causal/aggravating conditions associated therewith and provides metrics and recommendations to prevent stress on bees and reduce a probability of colony collapse disorder.

Turning now to an overview of the aspects of the invention, one or more embodiments of the invention address the above-described shortcomings of the prior art by determining and managing a hive health index of a hive via a cognitive hive architecture to prevent stress on bees and reduce a probability of colony collapse disorder. Embodiments of the cognitive hive architecture disclosed herein may include system, method, and/or computer program product that collect hive profile data (e.g., temperature, hive activity, honey production, etc.), provide intelligent feedback (e.g., hive body location, frame location, etc.), and provide feedback on how bees can best be utilized to ensure and increase colony health, hive health, and hive survival rates. Technical effects and benefits of embodiments herein include providing cognitive solution to ingest and analyze multi-faceted data with respect to beekeeping. Thus, embodiments described herein are necessarily rooted in the cognitive hive architecture (and one or more processors therein) to perform proactive operations to overcome problems specifically arising in the realm of cognitive.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
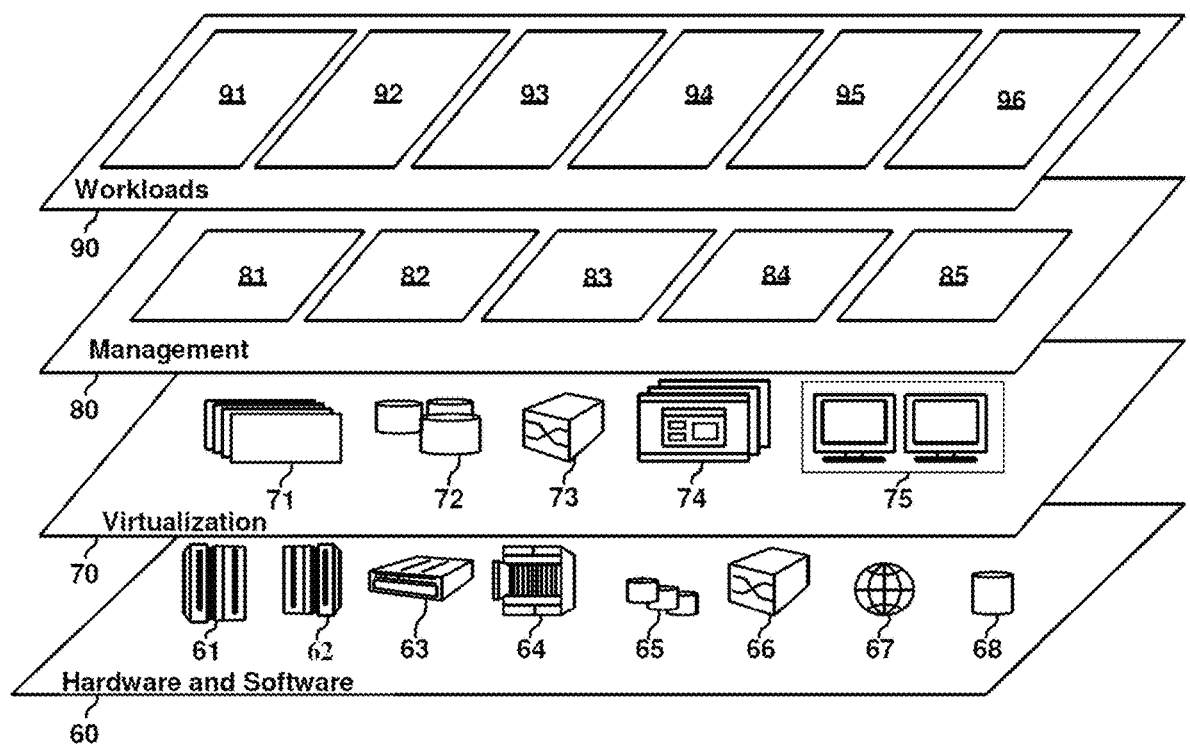
FIG. 2 depicts abstraction model layers in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive hive architecture 96.

Figure 3:
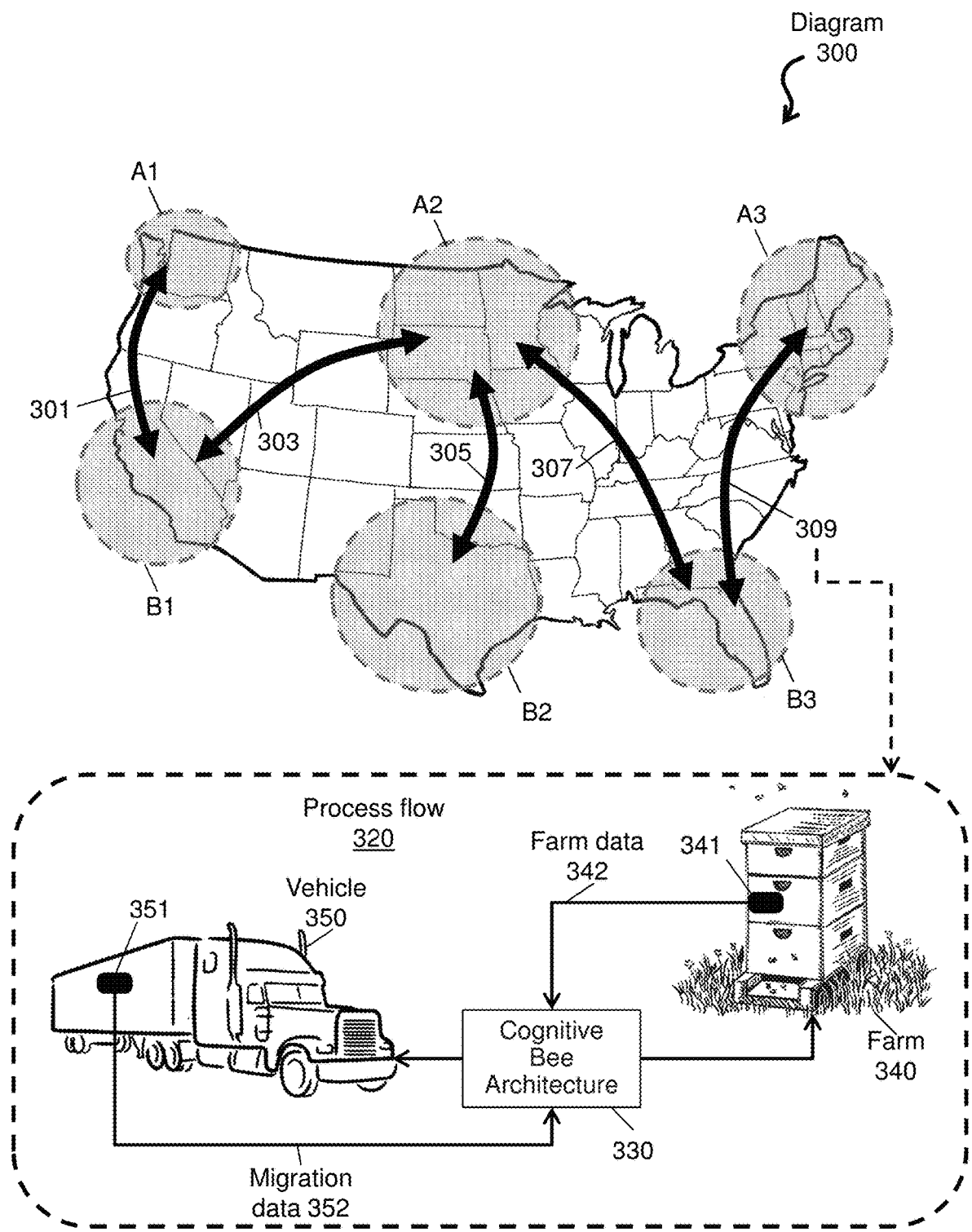
FIG. 3 depicts a diagram in accordance with one or more embodiments.

FIG. 3 depicts a diagram 300 in accordance with one or more embodiments. The diagram includes an example map of the United States of America with agricultural zones A1, A2, A3, B1, B2, and B3 superimposed thereon. The agricultural zones A1, A2, and A3 represent areas that bees may be utilized to pollinate agriculture, such that agricultural zones A1, A2, and A3 are typically conducive for spring and summer pollinating and agricultural zones B1, B2, and B3 are typically conducive for year round pollinating. As shown in FIG. 3, arrows 301, 303, 305, 307, and 309 represent bee migration between the agricultural zones A1, A2, A3, B1, B2, and B3.

Arrow 309 is further explained by a process flow 320 in accordance with one or more embodiments. The process flow 320 illustrates a cognitive bee architecture 330 interacting with a farm 340 (represented by a hive) by receiving from one or more sensors 341 farm data 342. The process flow 320 also illustrates a cognitive bee architecture 330 interacting with a vehicle 350 (represented by a truck) by receiving from one or more sensors 341 migration data 352.

The cognitive bee architecture 330, based on analyzing the migration data 351 and the farm data 352, can assist beekeepers, better understand colony collapse disorder, and prevent/counteract colony collapse disorder, along with better understand the effects of pesticides on colony health. For instance, the cognitive bee architecture 330 determines and manages a hive health index of a hive of the farm 340 based on the farm data 342 and the migration data 352.

The hive health index includes data sets that are collected and grouped into pillars in a hive profile. The pillars can include activity (i.e., bee count and bee activity), production (i.e., honey quantity (weight), honey quality (color), pollen), hygiene (i.e., mite count and propolis), and brood (i.e., pattern and egg count). The cognitive bee architecture 330 assigns a score from 0-100 for each data type based on data set compared to upper and lower ranges. The cognitive bee architecture 330 can be fixed (predetermined) or dynamic (based on data from other hives in the same geography, seasonal changes). The scores are aggregated to pillar level, and additional weighting may be assigned to some of the metrics (i.e., honey production). Pillar levels are checked against a minimum threshold, which can be a predetermined value from 0-100. If an aggregated score of a pillar level is lower than the minimum threshold, a prescriptive action is immediately required. The hive health index is generated by averaging all of the pillar scores. The hive health index and the pillar scores are updated in profiles.

In reply the farm data 342 and the migration data 352 and after calculating the hive health index and the pillar scores, for example, the cognitive bee architecture 330 can suggest crop rotation and field structure for bee health and pesticide options that are less harmful to bees. Also, for example, the cognitive bee architecture 330 can use analytics to recommend migration patterns for commercial bee industry (e.g., update route to next best location to ensure balanced nutrient diet and/or update driver with bee health to adjust speed) to sustain crops to ensure overall health of colonies.

Figure 4:
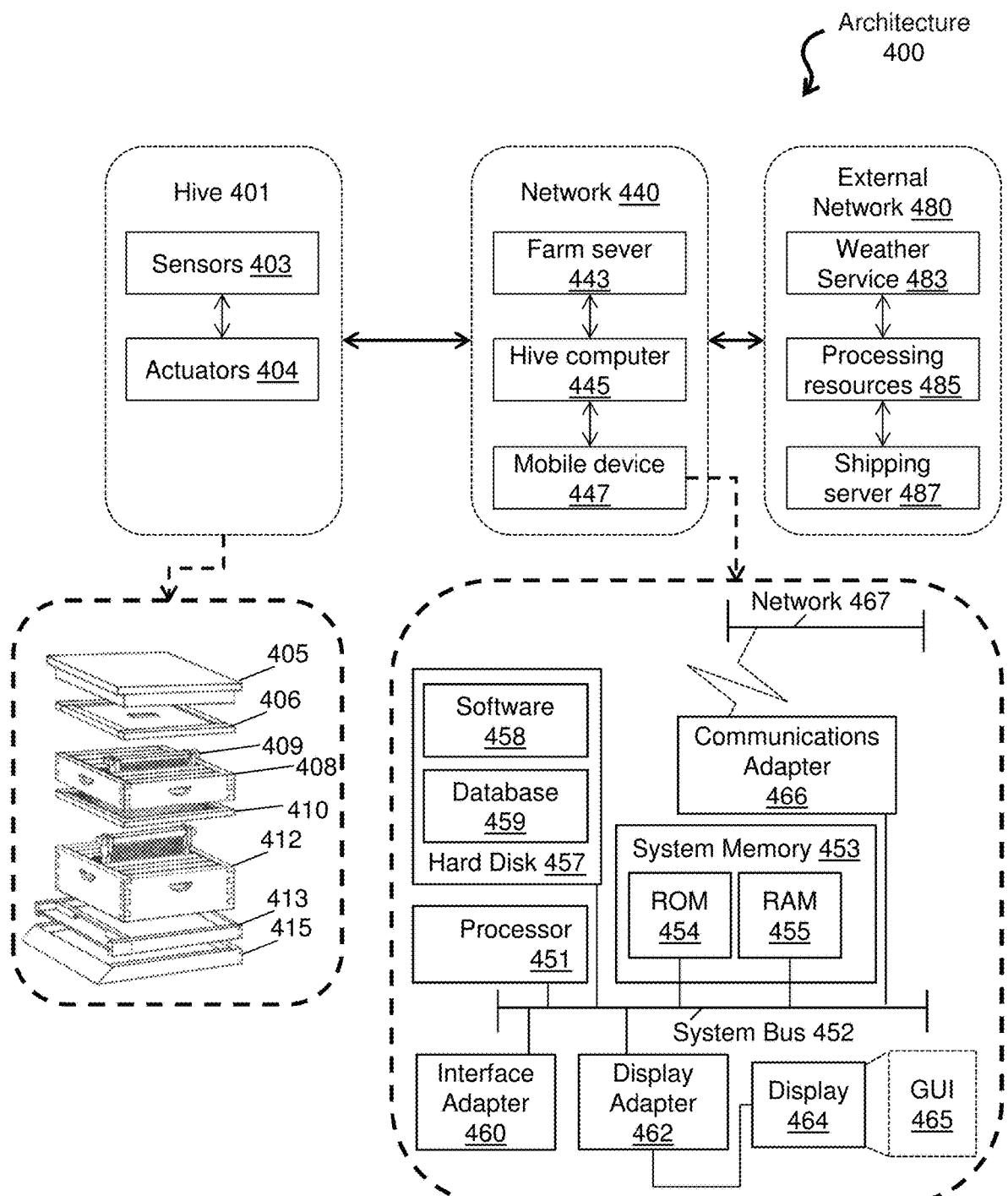
FIG. 4 depicts an architecture in accordance with one or more embodiments.

Turning now to FIG. 4, an architecture 400 is depicted in accordance with one or more embodiments. The architecture 400 can be considered an example of the cognitive bee architecture 330 of FIG. 3. The architecture 400 can include an electronic, computer framework comprising and/or employing any number and combination of computing device and networks utilizing various communication technologies, as described herein. The architecture 400 can be easily scalable, extensible, and modular, with the ability to change to different services or reconfigure some features independently of others. While single items are shown for the architecture 400, the items of the architecture 400 are considered representative of one or more items.

The architecture 400 can include a hive 401 where one or more sensors 403 and one or more actuators 404 are located. The hive 401 can be the entire stack of boxes and frames in which a colony of bees can live. The hive 401, for example, can include a roof 405, a crown board 406, one or more honey super 408, multiple frames 409, a queen excluder 410, one or more brood boxes 412, a floor 413, and a stand 415.

The roof 405 and crown board 406 cap off the hive 401 and protect the colony from weather. The honey supers 408 and the brood boxes 412 are for primary honey production and can hold fifteen to twenty-five frames 409. The frame 409 is an insert that bees use as a foundation to build wax onto. The queen excluder 410 is a selective barrier inside the hive 401 that allows worker bees but not the larger queens and drones to traverse the barrier. The floor 413 and the stand 415 support the hive 401.

The one or more sensors 403 and one or more actuators 404 are electronic devices operated by the architecture 400. The one or more sensors 403 can be any transducer that converts a physical property into an electrical signal. Examples of the one or more sensors 403 include, but are not limited to, one or more weight sensors, one or more cameras, and one or more microphones. The one or more sensors 403 can produce data based on monitoring one or more real-time conditions in a hierarchal structure and/or the mobile device 447 can translate data from the electrical signals from the one or more sensors 403. Further, the mobile device 447 can associate physical identifications (e.g., a frame identification, a box identification, and a hive identification) and positional identifications (e.g., a slot position and location, a box position and location, and a hive location) with the data based on monitoring one or more real-time conditions. For instance, the one or more sensors 403 and/or the mobile device 447 can use visual recognition (such as IBM Watson® Visual Recognition API) to count bees, count mites, identify brood disease, track flight patterns to pollen and can use beekeeper audio logs to convert audio signals into structured data via a text (e.g., Watson™ Speech to Text API), language translator (e.g., Watson™ Natural Language Understanding API), and tone analyzer (e.g., Watson™ Tone Analyzer API).

The one or more actuators 404 are mechanisms for repositioning one or more roof 405 (to control temperature of the hive), frames 409, the honey super 408, the brood box 412, and/or the stand 415 (to control position/direction of the hive). Examples of the one or more actuators 404 include, but are not limited to, hydraulic, pneumatic, mechanical, and electric actuators. The one or more actuators 404 are embedded within the hive 401 and are configured to operate components of the hive 401 with respect to instructions from the architecture 400 (e.g., prescriptive recommendations).

The architecture 400 can include a network 440. The network 440 can comprise a farm server 443, a hive computer 445, and a mobile device 447. The network 440 is a computer network that interconnects computers within a limited area, such as the area surrounding the hive 401 and local to a farm of the hive 401. The network 440 can provide a structure to support the one or more sensors 403, the one or more actuators 404, the farm server 443, the hive computer 445, and the mobile device 447 as an Internet of Things or IoT (e.g., a network of physical devices, vehicles, home appliances, and other items embedded with electronics, software, sensors, actuators, and connectivity which enables these things to connect, collect, and exchange data).

The mobile device 447 has a processor 451, which can include one or more central processing units (CPUs). The processor 451, also referred to as a processing circuit, microprocessor, computing unit, is coupled via a system bus 452 to a system memory 453 and various other components. The system memory 453 includes read only memory (ROM) 454 and random access memory (RAM) 455. The ROM 454 is coupled to the system bus 452 and may include a basic input/output system (BIOS), which controls certain basic functions of the mobile device 447. The RAM is read-write memory coupled to the system bus 452 for use by the processor 451.

The mobile device 447 includes a hard disk 457, which is an example of a tangible storage medium readable executable by the processor 451. The hard disk 457 stores software 458 and supports a database 459. The software 458 is stored as instructions for execution on the architecture 400 by at least the mobile device 447 and the processor 451 therein (to perform process, such as the process flows of FIGS. 5-7). The database 459 includes a set of values of qualitative or quantitative variables organized in various data structures to support and be used by operations of the software 458.

The mobile device 447 includes one or more adapters (e.g., hard disk controllers, network adapters, graphics adapters, etc.) that interconnect and support communications between the processor 451, the system memory 453, the hard disk 457, and other components of the mobile device 447 (e.g., peripheral and external devices). In one or more embodiments of the present invention, the one or more adapters can be connected to one or more I/O buses that are connected to the system bus 452 via an intermediate bus bridge, and the one or more I/O buses can utilize common protocols, such as the Peripheral Component Interconnect (PCI).

As shown, the mobile device 447 includes an interface adapter 460 that can interconnect a keyboard, a mouse, a speaker, a microphone, etc. to the system bus 452. The mobile device 447 includes a display adapter 462 interconnecting the system bus 452 to a display 464. The display adapter 462 (and/or the processor 451) can include a graphics controller to provide graphics performance, such as a display and management of a graphic user interface 465. A communications adapter 466 interconnects the system bus 452 with a network 467 enabling the mobile device 447 to communicate with other systems, devices, data, and software of the architecture 400. In one or more embodiments of the present invention, the operations of the software 458 and the database 459 can be implemented elsewhere in the architecture 400. For instance, the network 467 and components thereon can combine to provide internal iterations of the software 458 and the database 459 as a platform as a service, a software as a service, and/or infrastructure as a service (e.g., as a web application in a distributed system).

In general, the software 458 and the database 459 of the mobile device 447 of the architecture 400 collects data on the hive 401 to establish a hive profile and generate a hive health index as described herein. Based on data and/or records (e.g., the farm data 342 and the migration data 352 of FIG. 4), the architecture 400 can be used to make recommendations to improve the overall health of the hive 401. The architecture 400 matches frames 409, honey super 408, the brood box 412, and the hive(s) 401 with unique physical identifiers (e.g., serial numbers, quick response codes, etc.). The data and/or records can be collected in a hierarchal manner, starting from frame level, up to box level, and finally hive level. The data and/or records can be tagged with the unique physical identifiers, along with positional data (e.g., bottom box, frame slot 3). The data and/or records can also be ingested via the one or more sensors 403 as an IoT device: weight sensors, input of cameras or video feeds, and audio from activity tracking. The data and/or records is used to create/update profiles for each unique frame ID, box ID, and hive ID, as well as profiles for each frame slot position/location, box position/location, and hive location. Profiles contain all historical data. The data and/or records is then available for analytical engines.

In accordance with one or more embodiments, data can be collected from the one or more sensors 403 and is brought back to the architecture 400 in a continuous feedback loop. Recommendations are updated as the growing amount of data allows the architecture 400 to evolve and become more accurate, and respond to changes at the point of impact while seasons change, as the hive's colony grows. This is first done at the hive level. The same process can then applied with data shared among multiple local hives (e.g., a series of hive boxes in a beekeeper's back yard). Then, expanded and shared at a regional level, where things like a small exotic flowerbed in a neighbor's yard will not impact all hives in the whole region, but the general weather patterns, indigenous flora/fauna, terrain, and area specific predators are common considerations for beehives in that region (e.g., farms across New York state).

Thus, as configured in FIG. 4, the operations of the software 458 and the database 459 (e.g., the mobile device 447) are necessarily rooted in the computational ability of the processor 451 to overcome and address the herein-described shortcomings specifically arising in the realm of beekeeping. In this regard, the software 458 and the database 459 improve the computational operations of the processor 451 of the system 300 (thereby increasing an ability of the mobile device 447 to reduce or eliminate colony collapse disorder).

The hive computer 445 is a local computing device for managing hive data, which may also be recorded in a database (e.g., such as or similar to the database 459 of the mobile device 447). The hive data relates to one or more real-time conditions, monitored by the one or more sensors 403, which include one or more of frame level, box level, hive level, bee count, and audio levels. Further, the one or more real-time conditions include frame level, comb coverage, comb age, color, egg count, parasite count (e.g., mites and beetles), brood pattern, box level, temperature and humidity, box size/dimensions, presence of queen, bee count, bee activity (via sound), hive level, hive structure/design, location/direction (e.g., global positioning system), weight of hive, honey quality, royal jelly quantity, pollen characteristics, pollen type/quality, propolis amount (e.g., anti-bacterial), queen genealogy, and bee heritage (e.g., wild, purchased, nucleus, split method).

The farm server 443 is a local computing device for managing farm data. For instance, data about interactions with the hive 401 may also be recorded in a database (e.g., such as or similar to the database 459 of the mobile device 447) according to treatments (e.g., date, type/supplements, and dose information), harvest (e.g., date, quantity, opacity), and maintenance (e.g., winter preparation, repair actions, and replacement).

The configuration of the hive computer 445 can be similar to the mobile device 447, as described herein.

The architecture 400 can also include an external network 480. The external network 480 can include a weather service 483, processing resources 485, and a shipping server 487. The external network 480 can be a telecommunications network or computer network that extends over a large geographical distance/place and can be interpreted within the context of the cloud computing environment 50 of FIG. 1 described herein.

The weather service 483 provides weather forecasts, warnings of hazardous weather, and other weather-related data to the architecture 400. The processing resources 485 represent configurable computing resources, which can be interpreted within the context of the cloud computing environment 50 of FIG. 1 described herein. The shipping server 487 is a local computing device for managing shipping data. External data should/can include, but I not limited to, temperature, wind speed/direction, sunshine duration, drought/rainfall, pesticide presence, local agricultural, power lines, and predator damage data. Any data within the architecture 400 can be collected manually or automatically via IoT systems and other prior art.

Figure 5:
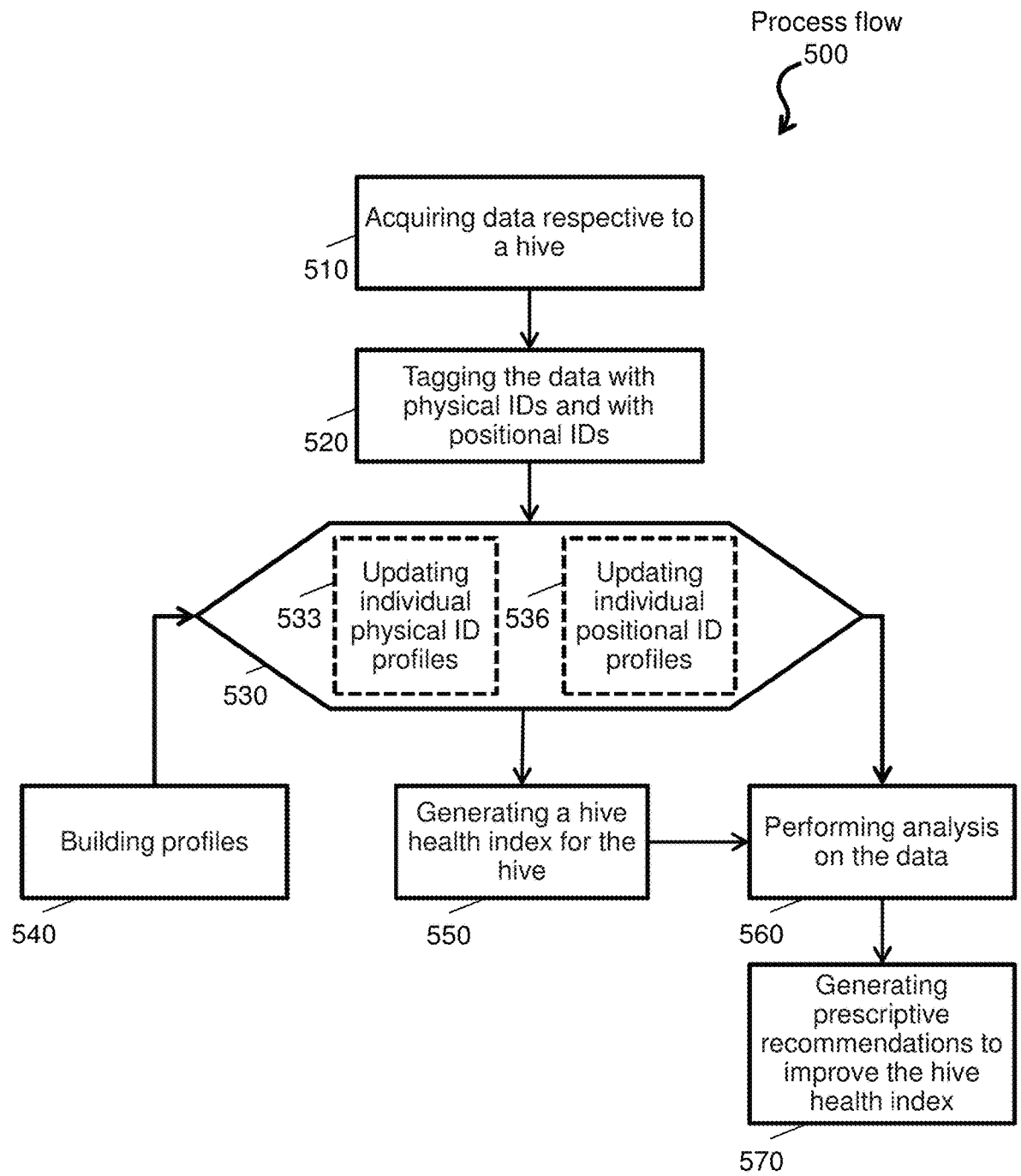
FIG. 5 depicts a process flow in accordance with one or more embodiments.
Figure 6:
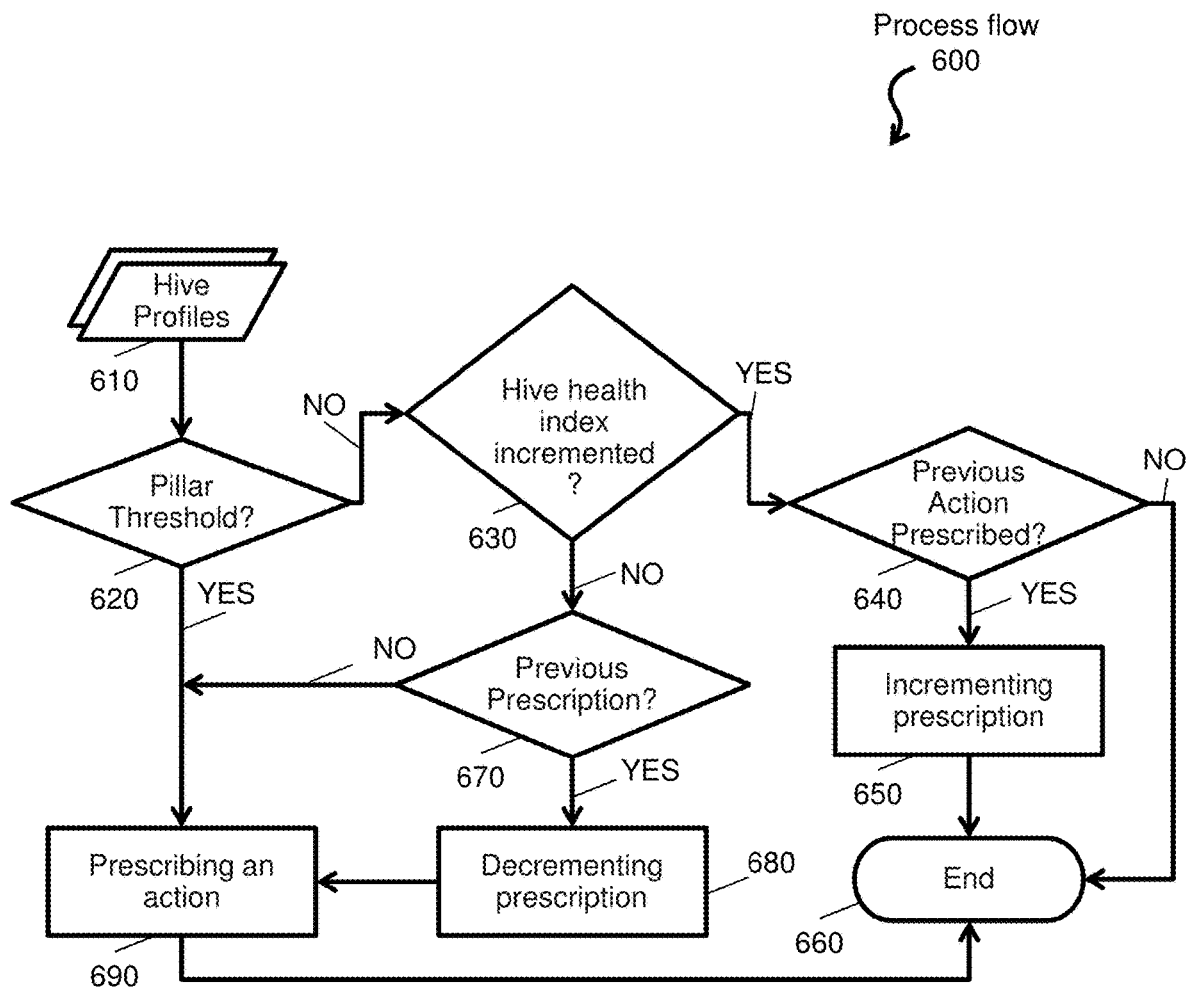
FIG. 6 depicts a process flow in accordance with one or more embodiments.
Figure 7:
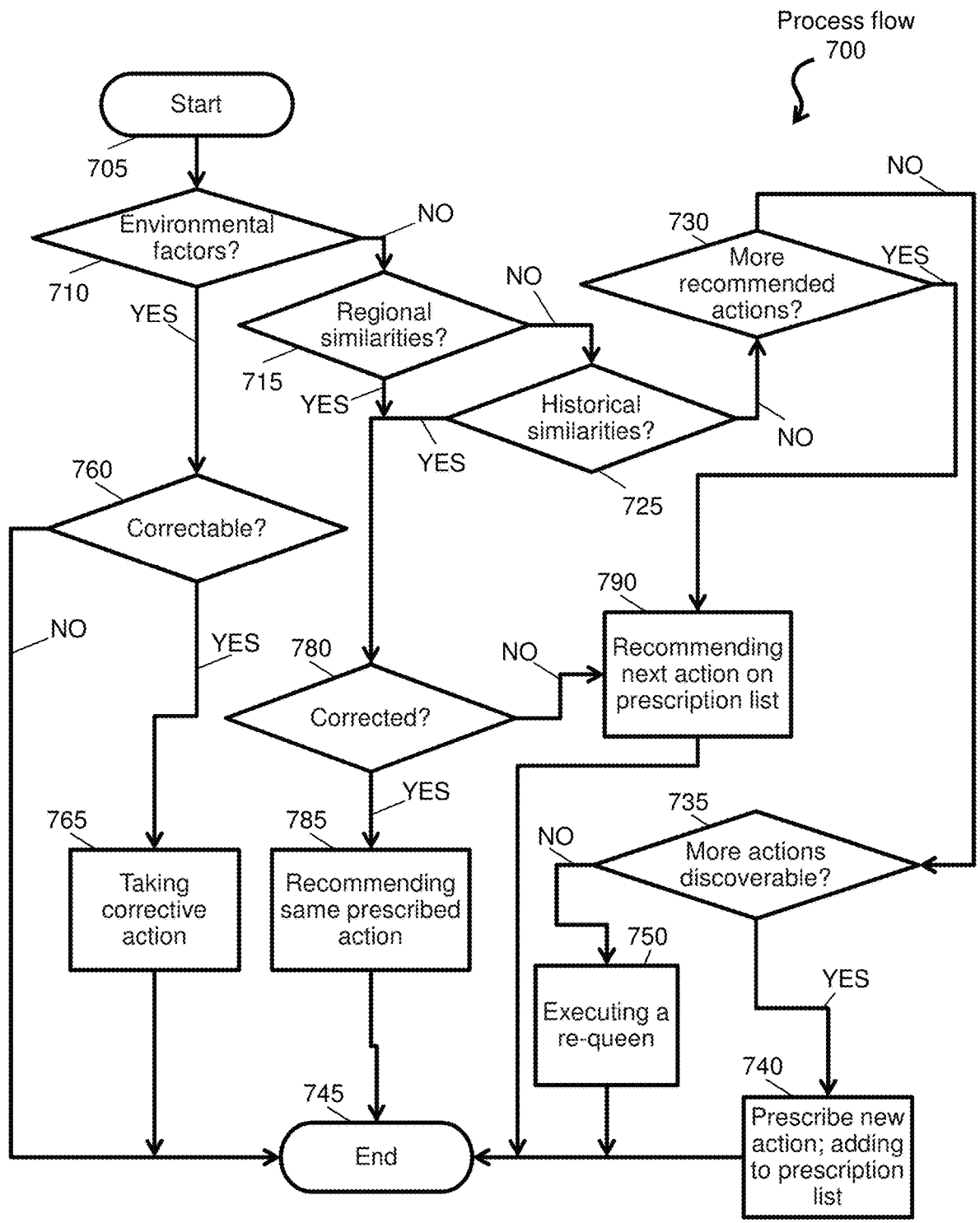
FIG. 7 depicts a process flow in accordance with one or more embodiments.

Operations of the architecture 400 are described with respect to FIGS. 5-7. Turning now to FIG. 5, a process flow 500 is depicted in accordance with one or more embodiments. The process flow 500, in general, operates to determine and manage a hive health index of the hive 401. The process flow 500 begins at block 510, where the architecture 400 acquires data from the one or more sensors monitoring one or more real-time conditions of the hive 401. The data represents the one or more real-time conditions. The data can be set to be collected on a time interval, such as one to ten seconds, one to ten minutes, and the like.

At block 520, the architecture 400 tags the data to physical identifications and positional identifications to produce tagged data. The physical identifications can include a frame identification, a box identification, and an individual hive or hive group identification (e.g.: all hives owned by a specific commercial beekeeping operation). The positional identifications can include a slot position and location, a box position and location, and a hive or hive group location (e.g.: all hives at a specific farm, or in a given agricultural zone).

At block 530, the architecture 400 associates the tagged data to profiles. More particularly, at block 533, the architecture 400 updates/associates the tagged data to physical identification profiles. Further, at block 536, the architecture 400 updates/associates the tagged data to positional identification profiles. In accordance with one or more embodiments, the physical identification profile can be created/updated with the tagged data and the positional ID profile is created/updated with the tagged data, contemporaneous with or prior to (as shown in FIG. 5 at block 540, i.e., builds the physical profiles and the positional profiles by executing an analysis of second data).

At block 550, the architecture 400 generates a hive health index based on a totality of data collected, such as the physical profiles and positional profiles. At block 560, the architecture 400 performs analysis on the data. For example, the architecture 400 executes analytics on the data, such as the physical profiles and positional profiles, which can produce a predictive analysis.

At block 570, the architecture 400 generates prescriptive recommendations. The prescriptive recommendation can comprise the hive health index and can be given to beekeepers based on hive health. The prescriptive recommendation can comprise data analytics with respect to the hive health index to improve the hive health index. The prescriptive recommendations can be based on historical trends (stored in any database of the architecture 400) and a resulting predictive analysis (from block 560) to improve hive health. In accordance with one or more embodiments, analytics can be executed on profile data to identify trends, treatment efficiencies, and overall health. Based on analytical data, recommendations can be made to improve hive health with respect to position (e.g., moving location of frames within a box, box within a hive via the one or more actuators 404), location/direction (e.g., reposition the hive 401 to a different geographical location or direction via the one or more actuators 404), treatments (e.g., type of treatments and amounts, as well as prescriptive treatments), nutrients (e.g., do additional supplements need to be provided based on migration data (commercial vs. natural)), brooding (e.g., identify high quality queens, based on hive health/characteristics, to raise new queens), environmental planning (e.g., flora or fauna be added/removed from local area to promote health).

FIG. 6 depicts a process flow 600 in accordance with one or more embodiments. At block 610, hive profiles are read into the architecture 400. At decision block 620, the architecture 400 determines whether there is a threshold alert on any of the pillars. Note that the pillars can be categorized into low activity, low production, low hygiene, and low brood. If there are no threshold alerts on any of the pillars, then the process flow 600 proceeds to decision block 630 via the NO arrow.

At decision block 630, the architecture 400 determines whether the hive health index has increased since previous analysis. If the hive health index has increased since previous analysis, then the process flow 600 proceeds to decision block 640 via the YES arrow.

At decision block 640, the architecture 400 determines whether an action has been previously prescribed during a last analysis. For example, prescribed actions for the low activity pillars can include improve nutrition sources and increase hive temperature. Prescribed actions for the low production can include increase food reserves and inspect pollen quality. Prescribed actions for the low hygiene can include use of a formic acid solution treatment, implementing Varroa screens, and drone trapping. Prescribed actions for the low brood can include checking for containments and check for a presence of a queen. If an action has been previously prescribed, then the process flow 600 proceeds to end at block 650 via the YES arrow. At block 650, the architecture 400 increases a recommendation factor of prescribed action. If no action has been previously prescribed, then the process flow 600 proceeds to end at block 660 via the NO arrow.

Returning to block 630, if the hive health index has not increased since previous analysis, then the process flow 600 proceeds to decision block 670 via the NO arrow. At decision block 670, the architecture 400 determines whether an action has been previously prescribed during a last analysis. If an action has been previously prescribed, then the process flow 600 proceeds to end at block 680 via the YES arrow. At block 680, the architecture 400 increases decreases a recommendation factor of prescribed action. Then, the process flow 600 proceeds to block 690, where the architecture 400 prescribes the action. Then the process flow 600 proceeds to end at block 660.

Returning to block 670, if no action has been previously prescribed, then the process flow 600 proceeds directly to block 690 via the NO arrow. Returning to block 620, there are any threshold alerts on any of the pillars, then the process flow 600 proceeds directly to block 690 via the YES arrow.

FIG. 7 depicts a process flow 700 in accordance with one or more embodiments. The process flow 700 relates to whether the prescriptive recommendation is based on one or more of environmental, reginal similarity, historical and previous action factors. The process flow 700 begins at start block 705 and proceeds to decision block 710. At decision block 710, the architecture 400 determines whether there are any known environmental factors contributing to hive health decline. If no, then the process flow 700 proceeds to decision block 715 via the NO arrow. At decision block 715, the architecture 400 determines whether there are other hives in the region (e.g., local, state, regional) suffering similar problems. In no, then the process flow 700 proceeds to decision block 725 via the NO arrow. At decision block 725, the architecture 400 determines whether other hives with shared history (e.g., location, hive components, travel) have similar problems. If no, then the process flow 700 proceeds to decision block 730. At decision block 730, the architecture 400 determines whether there more actions on the list that have not yet been prescribed. If no, then the process flow 700 proceeds to decision block 735. At decision block 735, the architecture 400 determines whether there are any more prescribed actions discoverable. In yes, then the process flow 700 proceeds to block 740. At block 740, if new action was discovered, the architecture prescribes the new action and adds that action to a list of future recommended actions. Then, the process flow 700 proceeds to end at block 745.

With respect to decision block 735, if the architecture 400 does not determine that there are any more prescribed actions are discoverable, then (as a last resort) the recommended action is to re-queen the hive, as shown at block 750. Then, the process flow 700 proceeds to end at block 745.

With respect to decision block 710, if the architecture 400 determines that there are known environmental factors (e.g., heating, cooling, and humidity) contributing to hive health decline, the process flow 700 proceeds to decision block 760. At block 760, the architecture 400 determines whether the environmental factors are correctable. In no, the process flow 700 proceeds to end at block 745. If yes, then the process flow 700 proceed to block 765, where the architecture 400 takes corrective action. Then, the process flow 700 proceeds to end at block 745.

With respect to decision block 715, if the architecture 400 determines that there are other hives in the region (e.g., local, state, regional) suffering similar problems, then the process flow 700 proceeds to decision block 780 via the YES arrow. Similarly, with respect to decision block 725, if the architecture 400 determines that there are historical similarities, then the process flow 700 proceeds to decision block 780 via the YES arrow. At decision block 780, the architecture 400 determines whether any environmental factors have been corrected to align with healthy hive profiles. If yes, then the process flow 700 proceeds to decision block 785 via the YES arrow. At block 785, the architecture 400 prescribe the same action that improved the health of similar hives. Then, the process flow 700 proceeds to end at block 745.

With respect to decision block 780, if no, then the process flow 700 proceeds to block 790 via the NO arrow. Similarly, with respect to decision block 730, if yes, then the process flow 700 proceeds to block 790 via the YES arrow. At block 790, the architecture 400 prescribes the next recommended action on the list based on recommendation factor. Then, the process flow 700 proceeds to end at block 745.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method by a cognitive hive architecture for determining and managing a hive health index of a hive, the cognitive hive architecture executable by at least one processor in communication with one or more computing devices or one or more computing environments, the cognitive hive architecture comprising a one or more sensors embedded within the hive, the computer-implemented method comprising:
   acquiring, by the cognitive hive architecture, data from the one or more sensors monitoring one or more real-time conditions of the hive, the data representing the one or more real-time conditions, the data further comprising migration data between agricultural zones, the agricultural zones comprising states;
   tagging, by the cognitive hive architecture, the data to physical identifications and positional identifications to produce tagged data;
   associating, by the cognitive hive architecture, the tagged data to physical profiles and positional profiles;
   generating, by the cognitive hive architecture, the hive health index based on the physical profiles and the positional profiles; and
   generating, by the cognitive hive architecture, at least one update to a pattern for migration to agriculture zones such that a next location in the pattern ensures an appropriate nutrient diet for the hive in a route of the pattern for migration, the at least one update based, at least in part, on the migration data and predictive analysis of the migration data, thereby improving a health of the hive, wherein the at least one update to the pattern comprises updating a driver to adjust speed to improve the health of the hive.

2. The computer-implemented method of claim 1, wherein the computer-implemented method comprises:
   building the physical profiles and the positional profiles by executing an analysis of second data.

3. The computer-implemented method of claim 1, wherein the computer-implemented method comprises:
   generating a prescriptive recommendation given to beekeepers based on hive health and data analytics comprising the hive health index.

4. The computer-implemented method of claim 3, wherein the computer-implemented method comprises:
   determining whether the tagged data has triggered a threshold alert;
   adjusting a recommendation factor with respect to whether the threshold alert was triggered; and
   generating the prescriptive recommendation with respect to the recommendation factor.

5. The computer-implemented method of claim 4, wherein the prescriptive recommendation is based on one or more of environmental, regional similarity, historical and previous action factors.

6. The computer-implemented method of claim 4, wherein the one or more sensors comprise one or more weight sensors, one or more cameras, and one or more microphones.

7. The computer-implemented method of claim 4, wherein one or more actuators are embedded within the hive and are configured to operate components of the hive with respect to the prescriptive recommendation.

8. The computer-implemented method of claim 1, wherein the physical identifications comprise a frame identification, a box identification, and an individual hive or hive group identification.

9. The computer-implemented method of claim 1, wherein the positional identifications comprise a slot position and location, a box position and location, and a hive or hive group location; and
   wherein the one or more real-time conditions include one or more of frame level, box level, hive level, bee count, and audio levels.

10. The computer-implemented method of claim 1, wherein the at least one update to the pattern extends between states.

11. A computer program product comprising computer readable storage medium having program instructions of a cognitive hive architecture for determining and managing a hive health index of a hive, the cognitive hive architecture in communication with one or more computing devices or one or more computing environments, the program instructions and the cognitive hive architecture executable by at least one processor to cause:
   acquiring data from one or more sensors monitoring one or more real-time conditions of the hive, the data representing the one or more real-time conditions, the data further comprising migration data between agricultural zones, the agricultural zones comprising states;
   tagging the data to physical identifications and positional identifications to produce tagged data;
   associating the tagged data to physical profiles and positional profiles;
   generating the hive health index based on the physical profiles and the positional profiles; and
   generating at least one update to a pattern for migration to agriculture zones such that a next location in the pattern ensures an appropriate nutrient diet for the hive in a route of the pattern for migration, the at least one update based, at least in part, on the migration data and predictive analysis of the migration data, thereby improving a health of the hive, wherein the at least one update to the pattern comprises updating a driver to adjust speed to improve the health of the hive.

12. The computer program product of claim 11, wherein the program instructions and the cognitive hive architecture are executable by the at least one processor to cause:
   building the physical profiles and the positional profiles by executing an analysis of second data.

13. The computer program product of claim 11, wherein the program instructions and the cognitive hive architecture are executable by the at least one processor to cause:
   generating a prescriptive recommendation given to beekeepers based on hive health and data analytics comprising the hive health index.

14. The computer program product of claim 13, wherein the program instructions and the cognitive hive architecture are executable by the at least one processor to cause:
   determining whether the tagged data has triggered a threshold alert;

adjusting a recommendation factor with respect to whether the threshold alert was triggered; and generating the prescriptive recommendation with respect to the recommendation factor.

15. The computer program product of claim 14, wherein the prescriptive recommendation is based on one or more of environmental, regional similarity, historical and previous action factors.

16. The computer program product of claim 14, wherein the one or more sensors comprise one or more weight sensors, one or more cameras, and one or more microphones; and wherein one or more actuators are embedded within the hive and are configured to operate components of the hive with respect to the prescriptive recommendation.

17. A cognitive hive architecture for determining and managing a hive health index of a hive, the cognitive hive architecture comprising at least one processor, the cognitive hive architecture in communication with one or more computing devices or one or more computing environments, the cognitive hive architecture executable by the at least one processor to cause:

acquiring data from one or more sensors monitoring one or more real-time conditions of the hive, the data representing the one or more real-time conditions, the data further comprising migration data between agricultural zones, the agricultural zones comprising states;

tagging the data to physical identifications and positional identifications to produce tagged data;

associating the tagged data to physical profiles and positional profiles;

generating the hive health index based on the physical profiles and the positional profiles; and generating at least one update to a pattern for migration to agriculture zones such that a next location in the pattern ensures an appropriate nutrient diet for the hive in a route of the pattern for migration, the at least one update based, at least in part, on the migration data and predictive analysis of the migration data, thereby improving a health of the hive, wherein the at least one update to the pattern comprises updating a driver to adjust speed to improve the health of the hive.

18. The cognitive hive architecture of claim 17, wherein the cognitive hive architecture is executable by the at least one processor to cause:

building the physical profiles and the positional profiles by executing an analysis of second data.

19. The cognitive hive architecture of claim 17, wherein the cognitive hive architecture is executable by the at least one processor to cause:

generating a prescriptive recommendation given to beekeepers based on hive health and data analytics comprising the hive health index.

* * * * *